Aug. 2, 1960

H. A. SCHURICHT ET AL 2,947,401

FLEXIBLE CHUTE

Filed June 10, 1957

INVENTORS
Henry A. Schuricht
Lawrence H. Smith
BY
Harness, Dickey & Pierce
ATTORNEYS

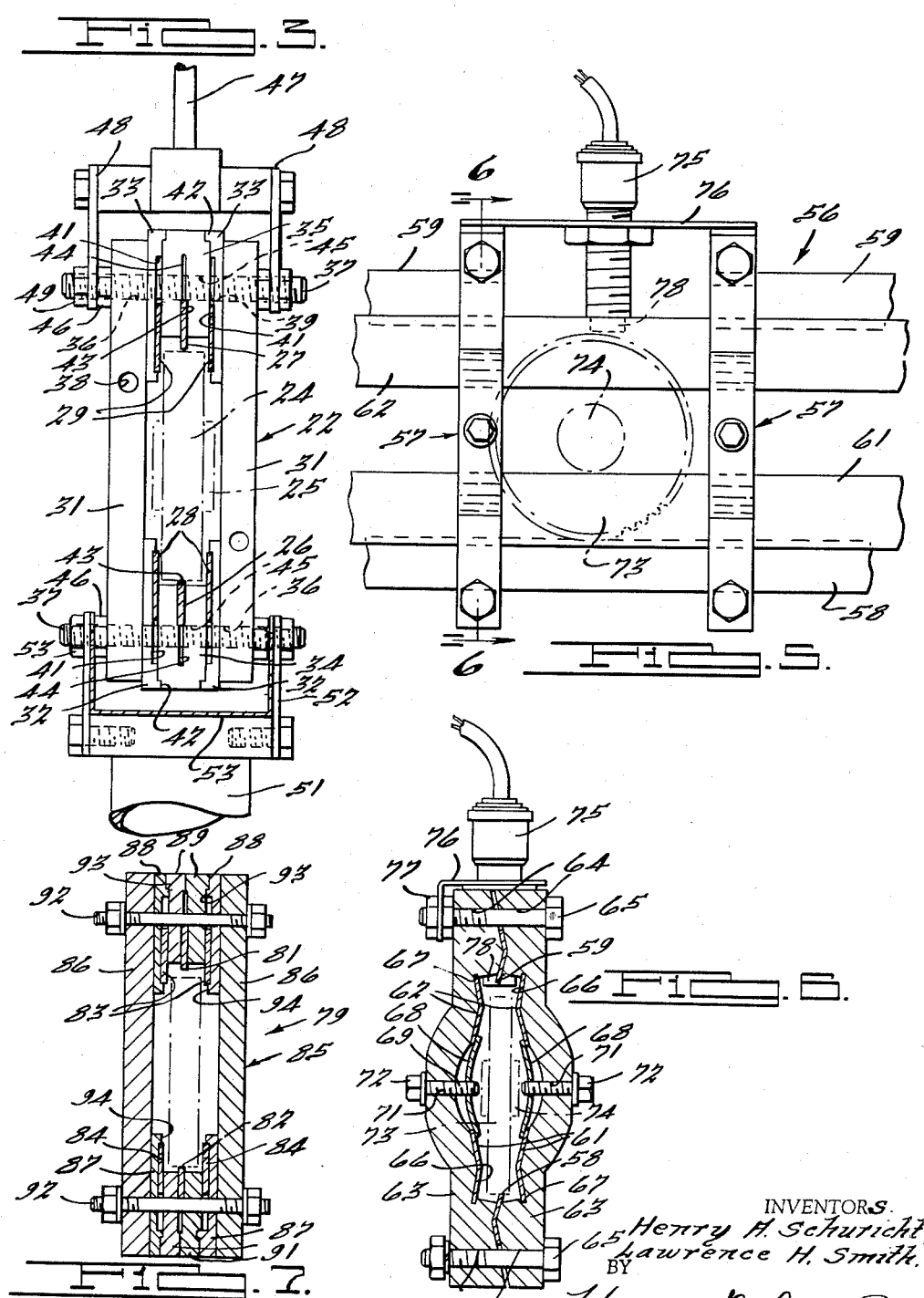

United States Patent Office 2,947,401
Patented Aug. 2, 1960

2,947,401

FLEXIBLE CHUTE

Henry A. Schuricht, Pontiac, and Lawrence H. Smith, Birmingham, Mich., assignors to Leading Engineering and Manufacturing Company, Pontiac, Mich., a corporation of Michigan Filed June 10, 1957, Ser. No. 664,536

6 Claims. (Cl. 193—25)

This invention relates to devices for conveying parts, and more particularly to chutes for guiding workpieces or the like between stations such as a series of machine tools in a manufacturing line.

The need for automatically conveying successive parts in a manufacturing process between adjacent machine tools has become increasingly important in recent years, especially due to the increase in automated equipment and processes in high production industrial establishments. While various types of chutes and conveyors have been used for this purpose, there has been need for a chute construction versatile enough to meet various needs in such plants and of sufficient flexibility so that it can be led around obstacles and in any desired path or location between adjacent stations.

It is an object of the present invention to provide a novel and improved flexible chute which will answer the needs described above and can be quickly and easily installed in a variety of positions in which it will serve as a stable guide track for circular or other parts which are to be conveyed from one location to another or to be temporarily stored during such conveyance.

It is also an object to provide an improved flexible chute of this nature which can be simply constructed in any length and to any shape by utilizing proper lengths of stock material which can be readily stored for this purpose, together with interchangeable clamping elements which may likewise be conveniently stocked.

It is a further object to provide an improved chute construction of this nature which is capable of carrying a variety of accessory elements such as limit switches and drip pans, and in which such accessories may be readily secured to the chute without interfering with its normal operation.

It is a further object to provide an improved chute construction of this nature in which the workpieces may be transported at various inclinations along different chute sections by proper assembly of the chute.

Other objects, features and advantages of the present invention will become apparent from the subsequent description, taken in conjunction with the accompanying drawings.

In the drawings:

Figure 3 is a cross-sectional view in elevation taken along the line 3—3 of Figure 2 and showing the clamp assembly construction;

Figure 5 is a fragmentary side elevational view of a modified form of the invention which utilizes a somewhat different arrangement of bands;

Figure 6 is a cross-sectional view in elevation of the embodiment of Figure 5 taken along the line 6—6 thereof; and Figure 7 is a cross-sectional view of another modification of the invention using two-part central clamping blocks.

In general terms, the invention comprises a plurality of spring steel bands which are secured in parallel relation in such a manner as to constitute a chute for the guidance of circular or other parts between adjacent spaces. These bands may be composed of pre-selected lengths of stock which may be stored in an industrial establishment for use whenever a chute is required to be constructed for a specific location and purpose. When assembled, the bands include upper and lower central bands and a plurality of side bands for guiding the workpieces therebetween. Clamping means are provided at spaced intervals along these parallel bands for the purpose of holding them in proper relative position, these clamp assemblies also serving to hold the combined bands in a predetermined path which may be either straight or curved, depending upon the desired location of the chute. The clamp assemblies are so constructed and arranged that when in position they will positively maintain the predetermined curvature of the chute without the necessity of providing any external securing or mounting members for this purpose. A single interchangeable type of clamp assembly may be utilized in each embodiment so that it will only be necessary to stock one type of clamp. The disposition of the clamp assemblies with respect to the chute will be such that circular parts having hubs of a moderate size may be transported or stored along the chute if desired. When it is necessary to change the position of a chute, it is merely necessary to loosen the clamping elements and reshape the chute, tightening the clamping elements to maintain the chute in its new configuration.

Figure 1:
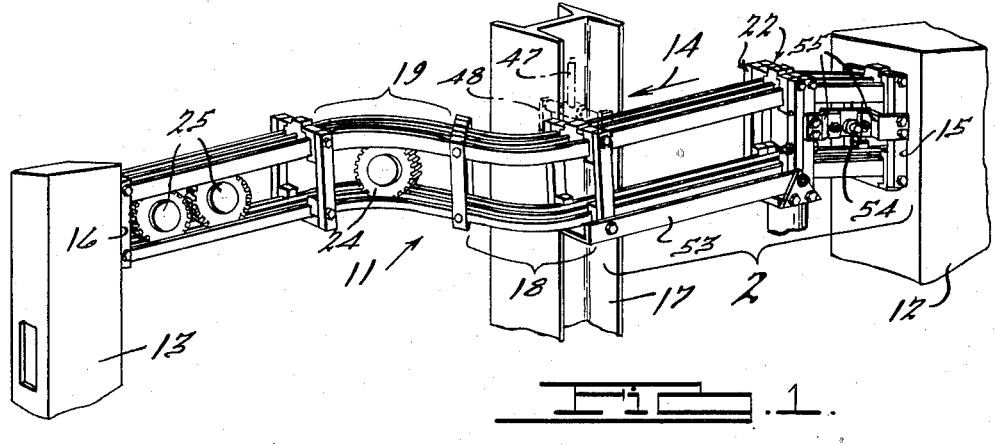
Figure 1 is a schematic perspective view showing the configuration of the flexible chute of this invention in a typical installation between two stations through which workpieces are to pass.

Referring more particularly to the drawings, Figure 1 shows a typical installation of the novel chute, generally indicated at 11, which extends between two stations shown partially at 12 and 13 respectively, these stations being machine tools or any other type of unit through which the workpieces are required to pass during their manufacture. In the present instance, the workpieces are considered to travel from station 12 to station 13 in the direction of the arrow indicated at 14 in Figure 1. The exit 15 from station 12 is shown as being at a higher level than the entrance 16 to station 13, so that the workpieces may move by gravity from station 12 to station 13. In order to illustrate the manner in which chute 11 may be formed so as to avoid obstructions, a pillar which may be part of the building structure is shown partially at 17. Chute 11 has a straight downwardly inclined path adjacent station 12 and then curves around pillar 17 as indicated in the area marked 18. A reverse curvature 19 is then provided in the chute so that it may be readily connected with the entrance of station 13.

Figure 2:
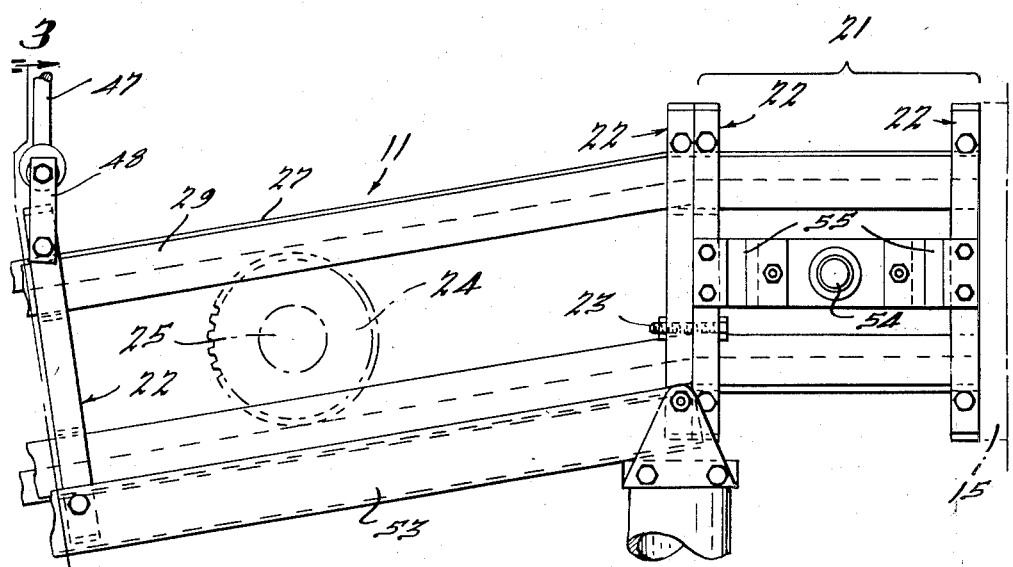
Figure 2 is a side elevational view of a portion of the chute indicated by the bracket "2" in Figure 1.
Figure 4:
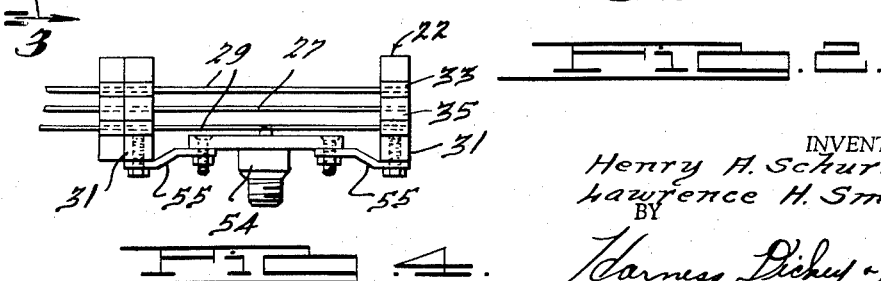
Figure 4 is a fragmentary top plan view showing the relative locations of the central and side bands.

Referring more particularly to Figures 2, 3 and 4, chute 11 comprises a short upper horizontal section indicated by the bracket 21 and a main inclined section which is connected at its upper end to section 21 and extends downwardly and outwardly therefrom. One end of section 21 is adapted to be connected to exit 15 of station 12 which is indicated in dot-dash lines in Figure 2. At the ends of section 21 are two clamp assemblies generally indicated at 22. Additional clamp assemblies are secured at spaced intervals along the extent of the main section of chute 11. All clamp assemblies 22 are preferably interchangeable, that is, they are duplicates of each other. The two adjacent clamp assemblies 22 between the upper end of the main section of chute 11 and the outer end of horizontal section 21 of the chute are secured together by bolts 23 as shown in Figure 2.

The chute is composed of a plurality of spring steel bands which are in spaced parallel relation and are secured together at intervals by clamp assemblies 22. The relative disposition of the bands is such that they form a channel for the passage or storage of workpieces. A typical workpiece is indicated by dot-dash lines at 24 in the figures. This workpiece may comprise, for example, a semi-finished gear having a pair of oppositely disposed hub portions 25. The bands comprise a central lower band 26, a central upper band 27, a pair of lower side bands 28 and a pair of upper side bands 29. In the embodiment of Figures 1–4, these bands are preferably composed of flat hardened spring steel stock with rounded edges which may be readily stored in coils and cut to required length. Two widths of bands are shown in the illustrated embodiment, a narrower width which is used for central bands 26 and 27 and a wider width used for side bands 28 and 29. Thus, the lengths required for bands 26 and 27 may be cut from a single coil of stock while the lengths required for bands 28 and 29 may be severed from another coil.

When in their assembled position, bands 26—29 are so disposed as to be capable of supporting a workpiece 24 and guiding its movement along the chute. In the position shown, all bands are in vertical planes so that parts 24 will rest on lower central band 26 and will be prevented from undue lateral movement by side bands 28 and 29, upper central band 27 preventing substantial upward movement of the parts. It will be understood however that the chute may be so positioned that the planes in which the bands lie will be other than vertical, and that they may likewise have a twisting or skewed configuration. In any cross-sectional plane along chute 11 however, all bands will be parallel to each other as shown in Figure 3. The facing edges of side bands 28 and 29 are closer together than the facing edges of central bands 26 and 27 so that unwanted lateral movement of the workpieces will be prevented.

Clamp assemblies 22 perform the dual function of holding bands 26—29 in proper relative position and clamping these bands together so that a pre-set shape of chute 11 will be retained. Each clamp assembly 22 comprises a pair of side bars 31, a pair of lower outer clamping blocks 32, a pair of upper outer clamping blocks 33, a lower central clamping block 34 and an upper central clamping block 35. All these parts are preferably of the same thickness, as seen in Figure 2, and may be fabricated where appropriate of extruded stock or the like which is cut to size. Side bars 31 are sufficiently long to provide a space which will accommodate workpieces 24 when the parts are assembled, and the bars are provided with transverse clearance apertures 36 at the opposite ends thereof for the reception of clamping bolts 37. These side bars are also provided with apertures 38 extending in the direction of extent of chute 11, these apertures being adapted to accommodate bolts 23 or similar fasteners where it is desired to connect adjacent clamp assemblies 22.

The inner surfaces of bars 31 engage the outwardly facing surfaces of lower outer clamping blocks 32 and upper outer clamping blocks 33. These blocks are provided with apertures 39 for the reception of bolts 37 and have shallow recesses 41 for the reception of bands 28 and 29. The depth of these recesses is such that when blocks 32 and 33 are forced against central blocks 34 and 35, bands 28 and 29 will be firmly secured in a frictional manner between the blocks. The height of recesses 41 is preferably such that bands 28 and 29 may be disposed at an angle with respect to the blocks. This is seen best in Figure 2, where it will be noted that clamp assembly 22 at the upper end of the main portion of chute 11 is disposed at an angle with respect to the chute bands. The outer ends of blocks 32 and 33 are provided with shoulders 42 which interlock with corresponding recesses in blocks 34 and 35 in order to maintain the relative positions of the blocks.

Central clamping blocks 34 and 35 are provided with outer flat surfaces for engagement with bands 28 and 29, and are further provided with central slots 43 for the reception of central bands 26 and 27. The main portions of slots 43 are sufficiently wide to receive the bands, but narrower portions 44 of the slots extend inwardly past the clearance apertures 45 provided in blocks 34 and 35 for bolts 37. In this manner, it will be seen that when the bolts are drawn up, bands 26 and 27 will be securely gripped within blocks 34 and 35 respectively. The arrangement is such that bands 26 and 27 may partially protrude from slots 43 so that the exposed edges of these banks will serve to support and guide workpieces 24.

In the illustrated embodiment bolts 37 comprise threaded members on which nuts 46 are mounted and tightened in order to draw together the side and central clamping blocks so as to secure the bands in place. If desired, a ceiling support 47 may be provided for chute 11, this support having brackets 48 secured to the outer ends of bolts 37 by nuts 49. Moreover, a floor mounting column 51 could be provided for the chute by attaching such column to the lower bolt 37 with brackets 52 and nut 49. It should be understood that the floor or ceiling supports are not essential parts of the invention but could be provided under appropriate conditions.

Figures 2, 3 and 4 additionally show several types of accessories which could be mounted on a chute if desired. A drip pan 53 of channel-shaped construction is shown as being secured to lower bolts 37. Such pans could be mounted in desired locations to prevent oil on workpieces 24 from dripping onto adjacent equipment. Figures 2 and 4 also show a limit switch 54 secured to the horizontal section 21 of chute 11 by means of brackets 55 secured to side bars 31. Such a limit switch could perform any of various functions in the manufacturing process. It will be observed that accessories such as those illustrated may be easily mounted on the chute without interfering in any way with the movement or storage of workpieces thereon.

Operation

Assuming it is desired to install a chute 11 between the exit 15 of station 12 and the entrance 16 of station 13 in the manner illustrated in Figure 1, appropriate lengths of coiled spring steel stock will be cut to provide bands 26, 27, 28 and 29. More specifically, four pieces of the wider stock will be cut to provide side bands 28 and 29 in section 21 of the chute, while two pieces of the narrower stock will be cut for central bands 26 and 27 in this section. Longer lengths of bands will be cut for the main section of chute 11 which extends from the outer end of section 21 to entrance 16 of station 13. After these lengths have been cut, section 21 may be assembled by providing two sets of clamp assemblies 22 and fitting bands 26—29 in the proper locations in these two clamp assemblies, as shown in Figures 2, 3 and 4. After bolts 37 have been tightened to firmly secure the bands, the main section of chute 11 may be similarly constructed using a plurality of additional clamp assemblies 22 at spaced intervals therealong.

Before the clamp assemblies 22 are tightened in the main section of chute 11, the chute will be deflected into its desired configuration as shown in Figure 1. This may be done in stages, with clamp assemblies 22 being tightened successively as each portion of the chute is flexed. As each clamp assembly is tightened, it will frictionally hold the bands in their flexed relationship, thus preventing them from returning to a straight configuration. For example, in the curved portion indicated at 18 in Figure 1, the bands on the inside of the curve will have a shorter length between adjacent clamp assemblies than the bands on the outside of the curve, and since the clamp assemblies will maintain this relationship, the bands will be prevented from springing back into a straight condition. The resulting structure will be quite rigid because the clamped bands will form a unitary stucture. If desired, successive sections of the chute may have different inclinations or may be horizontal, separate band sections being used for this purpose. Clamp assemblies 22 at the terminal ends of the main section of chute 11 will be secured to section 21 and to entrance 16 of station 13 respectively. Appropriate accessories such as a drip pan 53 or a limit switch 54 may be secured to the chute where desired, and supports such as ceiling support 47 or floor mounting column 51 may be utilized.

Parts 24 leaving station 12 will roll down through chute 11, the parts resting on lower central band 26 and being guided by side bands 28 and 29 and upper band 27. It should be noted that since side bars 31 are spaced from bands 28 and 29 by the thickness of clamp blocks 32 and 33, clearance for hubs 25 of workpieces 24 will be provided. It should also be observed that the workpieces carried by chute 11 could either be gravity fed or moved by some external means. Moreover, the parts need not necessarily be circular, since non-circular parts could slide along the chute with relatively little frictional resistance. Should a stoppage occur at station 13, chute 11 will serve to temporarily store the workpieces until the stoppage is cleared. The rounded band edges will prevent catching of the parts, especially at curves 18 and 19.

Should it be desired to alter the shape of chute 11 from that shown in Figure 1 at either the same or another location, it will merely be necessary to loosen appropriate clamp assemblies 22, readjust the chute and retighten the clamps. If use of the chute is no longer necessary, the parts may be disassembled and stored for future use elsewhere. In this manner a manufacturing establishment may readily equip itself for unknown future needs in its manufacturing processes merely by stocking the spring steel coils which comprise bands 26—29 and the interchangeable clamp assemblies 22.

Figures 5 and 6 illustrate a modified form of the invention which is similar in principle to the previous embodiment but which utilizes a somewhat different type of sprng steel band. The chute of Figures 5 and 6 is generally indicated at 56 and comprises a plurality of clamp assemblies generally indicated at 57 together with a lower central band 58, an upper central band 59, lower side bands 61 and upper side bands 62. Central bands 58 and 59 as well as side bands 62 have shallow V-shaped cross-sectional configurations. Each clamp assembly 57 comprises a pair of bars 63 having outwardly curved central portions and straight end portions, with bolt apertures 64 provided in both end portions of the bars. The facing surfaces of the outer ends of bars 63 are of complementary V-shaped configuration, so that when the bars are drawn together by bolts 65 they will clamp central bands 58 and 59 therebetween with the facing edges of these bands protruding into the space between the central portions of bars 63.

The inner surfaces of bars 63 are provided with shallow V-shaped portions 66 against which bands 61 and 62 are secured when the chute is assembled. The bars adjacent surfaces 66 are notched as indicated at 67 so that the outer edges of side bands 61 and 62 will be retained. A pair of securing clips 68 are provided on bars 62 in order to secure the facing edges of bands 61 and 62 to the bars. A pair of draw bolts 69 are secured at their inner ends to clips 68 and extend through apertures 71 in bars 63 to the outer surfaces of these bars, bolts 69 having heads 72 which may be engaged by an appropriate tool to draw clips 68 outwardly. In this manner it will be seen that side bands 61 and 62 may be firmly secured to clamp assemblies 57 by frictional engagement through the medium of draw bolts 69. For illustrative purposes, Figures 5 and 6 show a circular workpiece 73 disposed within chute 56, the workpiece having hub portions indicated at 74. Likewise illustrated is a switch 75 which may be a proximity transducer or similar element used for control purposes in a manufacturing process. Element 75 is mounted on a bracket 76 secured to adjacent clamp assemblies 57 by nuts 77 mounted on bolts 65. In order that the head 78 of transducer 75 may be close to workpieces 73 passing along chute 56, band 59 is shown as having a gap between the two adjacent clamp assemblies 57 on which transducer 75 is mounted.

The operation of chute 56 shown in Figures 5 and 6 will be apparent from the foregoing description. In order to assemble chute 56, spring steel strip will be cut to form bands 58, 59, 61 and 62. Clamp assemblies 57 will then be attached to the bands at spaced intervals therealong, the bands being secured to the clamp assemblies by means of bolts 65 and 69. Since the bands will be held in tight frictional engagement with the clamp assemblies, chute 56 may be curved or skewed in the manner described with respect to the previous embodiment and will retain its pre-set configuration. The V-shaped nature of the bands will, moreover, help prevent slippage of the bands with respect to the clamp assemblies. Workpieces 73 may then roll along or be stored on the chute, resting on the protruding edge of band 58 and being guided by bands 59, 61 and 62. It should be observed that since the apices of side bands 61 and 62 will face the interior of the chute, workpieces 73 will engage these apices, thus reducing the frictional engagement between the workpieces and chute. It should also be noted that because of the curved configuration of the central portions of side bars 63 and clips 68, clearance for hubs 74 of workpieces 73 will be provided. Chute 56 may be dismantled or rearranged in a manner similar to that described with respect to the previous embodiment.

Figure 7 illustrates still another embodiment of the invention which is generally similar to that illustrated in Figures 2–4 but in which each central clamping block is made up of two parts. The chute illustrated in Figure 7 is generally indicated at 79 and comprises an upper central band 81, a lower central band 82, upper side bands 83, lower side bands 84 and a plurality of clamp assemblies generally indicated at 85. Each clamp assembly comprises a pair of side bars 86, a pair of lower outer clamping blocks 87, and a pair of upper outer clamping blocks 88. The clamping assembly further comprises a pair of upper central clamping blocks 89 and a pair of lower central clamping blocks 91, these clamping blocks serving to secure bands 81 and 82 respectively. The facing surfaces of clamping blocks 89 and 91 are provided with recesses for the reception of bands 81 and 82, these recesses extending past bolts 92 so that the latter may serve to draw the clamping blocks against the bands. Outer clamping blocks 87 and 88 are likewise provided with recesses for the reception of side bands 83 and 84. The outer and central clamping blocks are further provided with interlocking portions indicated at 93 to prevent relative movement between the blocks. Retaining shoulders 94 are provided at the facing edges of clamping blocks 87 and 88 to retain bands 83 and 84 in position.

It will thus be seen that a highly versatile flexible chute construction is provided by means of which many different types of chute arrangements may be constructed using a minimum amount of equipment and interchangeable parts which may be stored and re-used. The chute permits the use of a variety of accessories mounted thereon and can be used to convey or store both circular and non-circular workpieces.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a flexible chute, a pair of central bands of spring steel in spaced parallel relation and having uninterrupted exposed surfaces and facing edges, two pairs of spring steel side bands parallel to said central bands spaced laterally therefrom, said side bands having uninterrupted exposed surfaces, said central and side bands together forming a channel through which a series of workpieces may pass, a plurality of interchangeable clamp assemblies in spaced relation along said bands, each of said clamp assemblies having members for frictionally gripping the band surfaces at any point therealong, and means for drawing together said gripping members into a rigid assembly and simultaneously gripping said band surfaces in firm frictional contact, whereby the bands may be held in a predetermined configuration.

2. The combination according to claim 1, the clamping members of each clamp assembly comprising a pair of bars having outwardly curved central portions, facing surfaces at the opposite end portions of said bars for frictionally gripping said central bands therebetween, surfaces on the intermediate portions of said bars for supporting said side bands, and means for drawing said side bands outwardly against said last-mentioned surfaces.

3. The combination according to claim 2, said side bands each having a shallow V-shaped cross-sectional configuration with the apices thereof facing inwardly.

4. In a flexible chute, a pair of central bands of spring steel in spaced parallel relation and having facing edges, two pairs of spring steel side bands parallel to said central bands and spaced laterally therefrom, said side and central bands together forming a channel through which a series of workpieces may pass, a plurality of interchangeable clamp assemblies in spaced relation along said bands, each of said clamp assemblies having members for frictionally gripping the bands at any point therealong, the clamping members of each clamp assembly comprising a pair of side bars, a pair of central clamping blocks, slots in said central blocks for receiving said central bands so that the facing edges thereof project from said central clamping blocks, and outer clamping blocks engageable with the sides of said central clamping blocks, said side bands being disposed between said central and outer clamping blocks; and means for drawing together said gripping members into rigid assembly and simultaneously gripping said bands, whereby the bands may be held in a predetermined configuration.

5. The combination according to claim 4, said means for drawing together the gripping members comprising a pair of bolts extending through said clamping blocks and side bars at opposite ends thereof, the slots in said central clamping blocks extending past said bolts, whereby tightening of said bolts will cause said central clamping blocks to frictionally engage said central bands.

6. The combination according to claim 4, said central and outer clamping blocks being provided with interlocking portions to prevent relative displacement thereof.

References Cited in the file of this patent

UNITED STATES PATENTS

| | | |
|---|---|---|
| 1,630,345 | Lanza | May 31, 1927 |
| 2,744,601 | Chilton | May 8, 1956 |
| 2,815,841 | Dabich | Dec. 10, 1957 |